United States Patent
Marvan et al.

(10) Patent No.: US 9,835,227 B2
(45) Date of Patent: Dec. 5, 2017

(54) CONNECTING DEVICE OF ELASTIC EXERCISE CORD WITH STRAPS

(71) Applicant: KRANKFITNESS S.R.O., Brno (CZ)

(72) Inventors: Jan Marvan, Nove Mesto Na Morave (CZ); Tomas Sara, Brno (CZ)

(73) Assignee: KRANKFITNESS S.R.O. (CZ)

( * ) Notice: Subject to any disclaimer, the term of this patent is extended or adjusted under 35 U.S.C. 154(b) by 0 days.

(21) Appl. No.: 15/595,148

(22) Filed: May 15, 2017

(65) Prior Publication Data

US 2017/0248193 A1   Aug. 31, 2017

Related U.S. Application Data

(63) Continuation of application No. 14/479,768, filed on Sep. 8, 2014, now abandoned.

(51) Int. Cl.
| | |
|---|---|
| *A63B 21/02* | (2006.01) |
| *F16G 11/02* | (2006.01) |
| *A63B 21/00* | (2006.01) |
| *A63B 21/055* | (2006.01) |
| *F16G 11/00* | (2006.01) |

(52) U.S. Cl.
CPC ........ *F16G 11/02* (2013.01); *A63B 21/00185* (2013.01); *A63B 21/0552* (2013.01); *A63B 21/151* (2013.01); *A63B 21/0004* (2013.01); *A63B 21/02* (2013.01); *F16G 11/00* (2013.01)

(58) Field of Classification Search
CPC ..... A63B 21/151; A63B 24/30; A63B 24/301; A63B 21/0557; Y10T 16/4724; Y10T 16/508; B65D 25/287; B65D 25/273; B65D 25/2876; B65D 25/2879
See application file for complete search history.

(56) References Cited

U.S. PATENT DOCUMENTS

| | | | |
|---|---|---|---|
| 5,205,803 A | * | 4/1993 | Zemitis .............. A63B 21/0552 482/121 |
| 5,807,214 A | * | 9/1998 | Riazi .................. A63B 21/0552 24/196 |
| 6,202,263 B1 | | 3/2001 | Harker |

(Continued)

*Primary Examiner* — Loan H Thanh
*Assistant Examiner* — Rae Fischer
(74) *Attorney, Agent, or Firm* — Ostrolenk Faber LLP

(57) ABSTRACT

The present invention involves a connecting device of elastic exercise cord with straps, which comprises a hollow body (12) provided by a through-made channel (13) with an upper opening (14) and a lower opening (15), wherein into the upper opening (14) arms (7,8) of a strap (3) are introduced first by its upper section (9), these arms (7,8) are passed through the channel (13) and bended over the edge of the lower opening (15) about 180° and the arms (7,8) are arranged along outer surface of the hollow body (12) up to the outer edge of the upper opening (14), wherein above the upper opening (14) the lower sections (10) of the arms (7,8) of the strap (3) are joined with upper section (9) to one joint, wherein the hollow body (12) with above mentioned arrangement of arms (7,8) is arranged in the cavity (16) of the tubing core (2) and this joint of the lower sections (10) of arms (7,8) of the strap (3) with upper sections (9) is together with the tubing core (2) provided by a collet (17) and the outer surface of the hollow body (12) together with portion of the strap (3) is wrapped.

12 Claims, 4 Drawing Sheets

(56) References Cited

U.S. PATENT DOCUMENTS 7,794,374 B1 * 9/2010 Park ................... A63B 21/0004
                                                        482/122
D785,733 S  *  5/2017 Ross ........................... D21/694

* cited by examiner

CONNECTING DEVICE OF ELASTIC EXERCISE CORD WITH STRAPS

CROSS-REFERENCE TO RELATED APPLICATION

The present application is a continuation under 37 C.F.R. §1.53(b) of prior U.S. patent application Ser. No. 14/479,768, filed Sep. 8, 2014, the entire contents of which application are incorporated herein by reference.

BACKGROUND OF THE INVENTION

Field of the Invention

The invention concerns elastic exercise cord, more exactly the construction of a connecting device of elastic exercise cord with straps.

Description of the Related Art

There exist exercise equipment for training with elastic exercise cord shown schematically in FIG. 1. In FIG. 2 is then presented one of variant how to use such equipment.

Such elastic exercise cord of an elderly type is known from document U.S. Pat. No. 5,205,803 B1. Cord is made as elastic full cord without any cavity in its center and is provided on both ends with a strap in the form of a loop. In the inner part of strap, which is covered by the sleeve member, an eye from the strap is made, through which the end of the cord is passed-through. Then the end of the cord is bent and fast attached again to the cord and so a joint is created. Nevertheless the eye from the strap is not tough enough and creating the eye is complicated.

Such elastic exercise cord 1 is known from document U.S. Pat. No. 6,202,263 B1. Cord 1 is made of an elastic tubing core 2, which is made as an elastic hollow hose provided on both ends with a strap 3 in the form of a loop. The elastic tubing core 2 is provided by a sleeve member 4 in the form of the longitudinal collapsible hollow sleeve or a tube, which is on its ends tightly fastened to elastic tubing core 2 or the straps 3.

In FIG. 2 one of variant how to train with such elastic exercise cord 1 is shown. It can be seen, how the cord 1 is griped by the strap 3 by person. And particularly the connection between the tubing core 2 and the strap 3 is the subject of the invention. This area is indicated as D in FIG. 1

In the above mentioned document U.S. Pat. No. 6,202,263 B1 several types of connecting devices of elastic exercise cord with the straps are presented. Part of them is based on the principle, where a knot from the tubing core is made and thereby the core is fixed on a steel attachment members with hooks, by which the straps are fixed. In other embodiments the knot is substituted by a ball fixed in the hollow hose of the tubing core, which creates an analogy to the knot. This fixation is not safe and in consequence of possible defect of material the strap could be torn off. In one embodiment is the connection made by an eye, which has a protrusion, which is fixed in the cavity of the hollow hose of the tubing core and the strap is pulled through this eye. Although the eye fixes the strap securely, the fixation of the eye is the cavity of the tubing core is not stable.

SUMMARY OF THE INVENTION

The above drawbacks are eliminated to a large extend by connecting device of elastic exercise cord with straps according to the invention which comprises a hollow body provided by a through-made channel with an upper opening and a lower opening, wherein into the upper opening arms of a strap are introduced first by its upper section (9), these arms are passed through the channel and bended over the edge of the lower opening about 180° and the arms are arranged along outer surface of the hollow body up to the outer edge of the upper opening, wherein above the upper opening the lower sections of the arms of the strap are joined with upper section to one joint, wherein the hollow body with above mentioned arrangement of arms is arranged in the cavity of the tubing core and this joint of the lower sections of arms of the strap with upper sections (9) is together with the tubing core provided by a collet and the outer surface of the hollow body together with portion of the strap is wrapped.

In an illustrative embodiment the outer surface of the hollow body is provided by roughening.

In another illustrative embodiment the hollow body with introduced strap is together with tubing core provided by a collet.

The aim of the invention is to present a new construction of connecting mechanism for safe connection of the tubing core to the strap, which should secure a safe and long-life connection.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
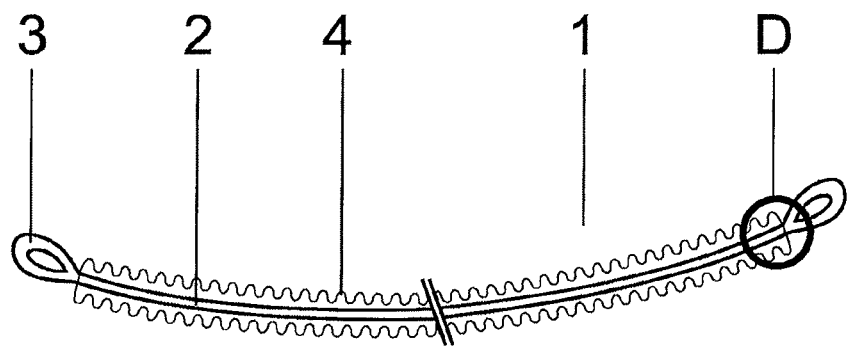
FIG. 1 is a schematic cross-section of the prior art elastic exercise cord in an unloaded state.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

In FIG. 1 an area D, where the tubing core 2 is attached to the strap 3 in the form of a loop is indicated. And particularly in FIG. 4 a detail of the mutual arrangement between the tubing core 2 and the strap 3 in this area D is illustrated.

Figure 2:
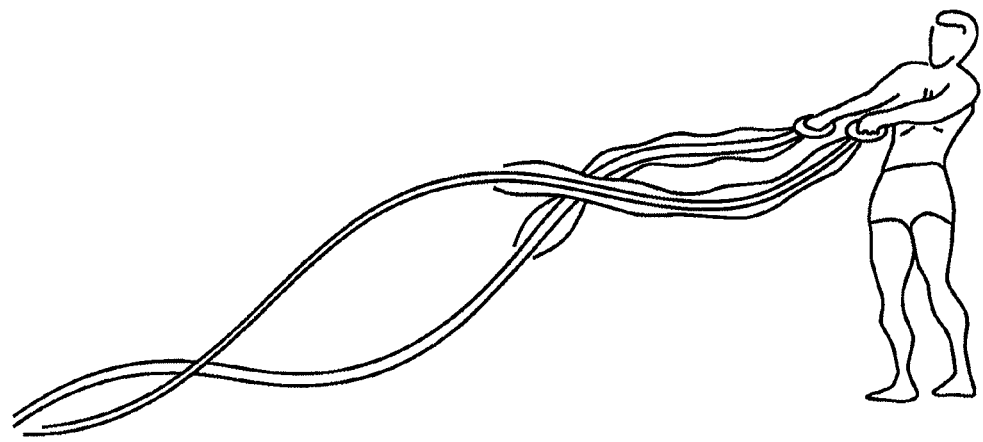
FIG. 2 is an example of the manner of the training with the elastic exercise cord of FIG. 1.

The tubing core 2 shown in the example is from the rubber. The sleeve member 4 shown in the example is made from polyamide. It is waterproof, the steam can go through, with UV protection and resistant to abrasion. On the ends of the sleeve member 4, the material is doubled for easier grip and for higher resistance to abrasion and especially against vigorous tugs. Due to the sleeve member 4 the elastic exercise cord acquires resilience in any type of use, provides the protection to the elastic tubing core 2 against external unfavorable influences and it protects exercising person against the rupture of the elastic tubing core 2 in case of its rupture. The length of the sleeve member 4 determines the maximal length to which the cord can be extended. The ratio of unloaded length of the elastic tubing core 2 to the length of the sleeve member 4 is 1:2 up to 1:4, therefore the length of the sleeve member 4 can represent 200 up to 400% of unloaded length of the cord core 2. In FIG. 2 the schematical cross-section of the elastic exercise cord 1 during training is presented. By a comparison of FIG. 1 and FIG. 2 can be seen that the outside surfaces of the elastic tubing core 2 and of sleeve member 4 in the loaded state are basically parallel, in an unloaded state the sleeve member 4 is pleated.

Figure 3:
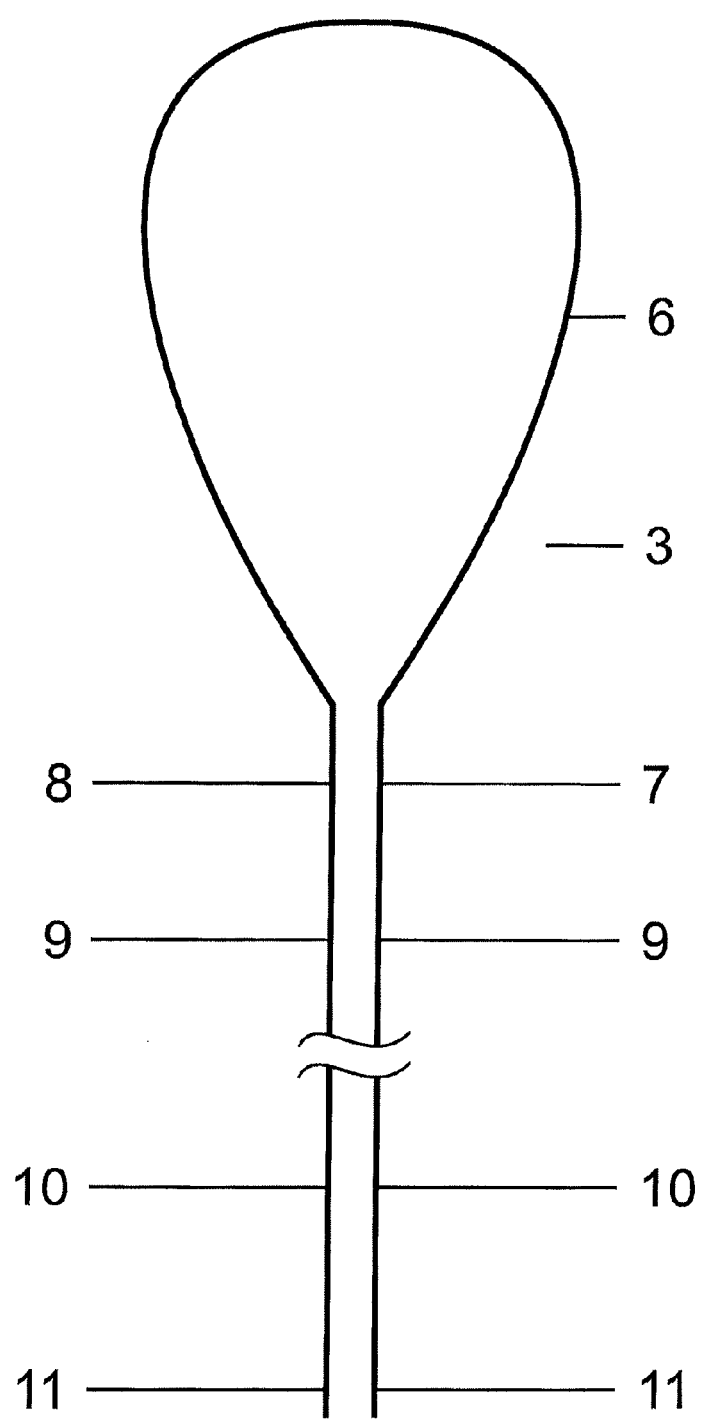
FIG. 3 is a schematic view on a strap before its fixation to the cord according to one embodiment.

In FIG. 3 for better definition of the invention the construction of the used strap 3 is schematically shown in detail and in state, in which it is applied in the first step of assemblage into the connecting device 5 according to the invention.

It can be seen, that the strap 3, usually made from flat strap, is bended in half of its length and so the loop 6 is created, from which two arms 7, 8 protrude. These arms 7, 8 have an upper section 9 and adjacent lower section 10 ended by free ends 11.

Figure 4:
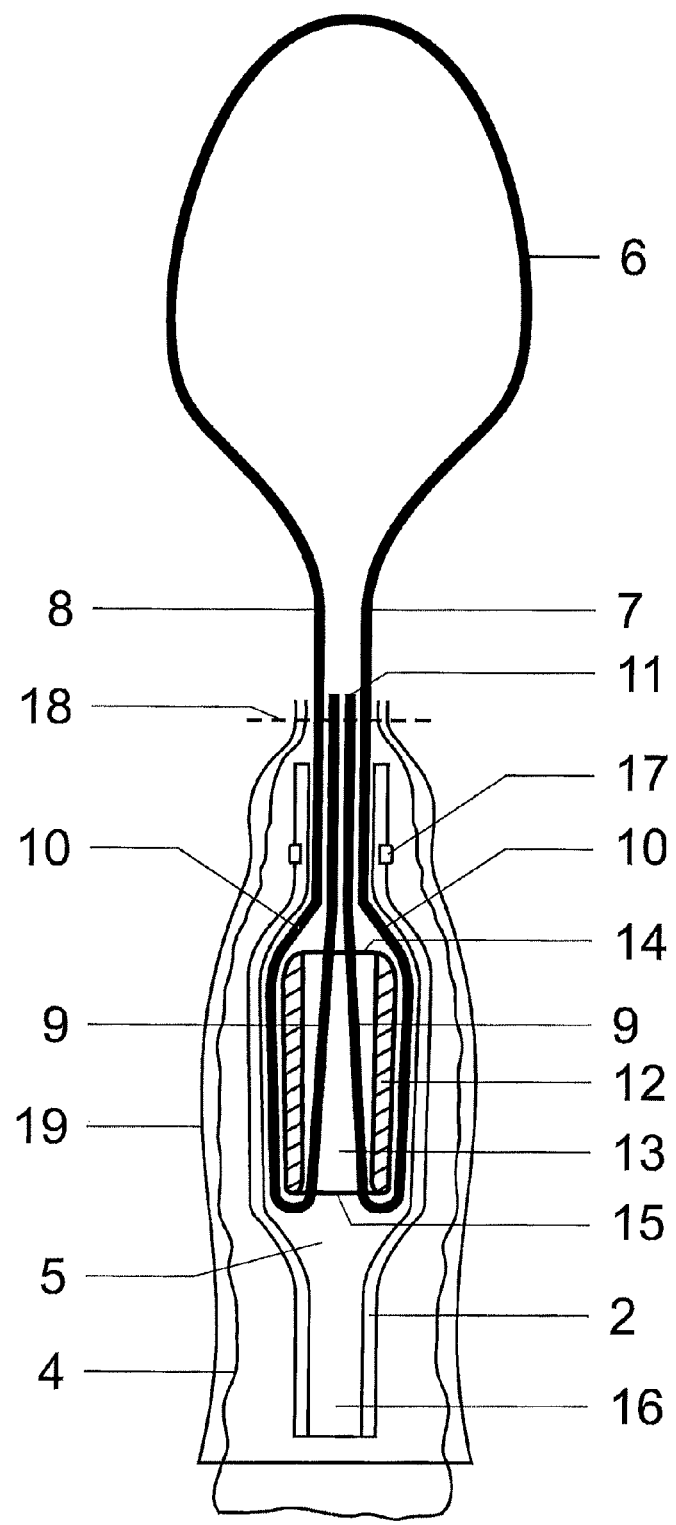
FIG. 4 is a cross-section view of the construction of the connecting mechanism for safe connection of the cord to the strap, shown in FIG. 3 according to the invention.

In the complete assembly in FIG. 4 is shown, that the main part of the connecting device 5 is the hollow body 12 provided by through-made channel 13 with an upper opening 14 and a lower opening 15. Into the upper opening 14 the arms 7, 8 of the strap 3 are introduced and that by its upper section 9. They are passed through the channel 13 and bended over the edge of the lower opening 15 about 180° and the arms 7, 8 are led along outer surface of the hollow body 12 back to the outer edge of the upper opening 14. Over the upper opening 14 the lower sections 10 of the arms 7, 8 of the strap 3 are joined to the upper sections 9 to one joint. The hollow body 12 with above mentioned arrangement of arms 7, 8 is pressed into the cavity 16 of the tubing core 2. Afterwards the bunch of the lower sections 10 of the arms 7,8 of the strap 3 with upper sections 9, which is arranged also in the cavity 16 of the tubing core 2, tough hooped together with the tubing core 2 by a collet 17 and above the collet 17 only free ends 11 of the strap 3 are protruded. Before inserting into the cavity 16 of the tubing core 2, the hollow body 12 with on its outer surface arranged portion of the strap 3 is provided by adhesive tape or contraction foil for better compactness and easier insertion into the cavity 16. The channel 13 is for illustration purposes relatively large, in real it can be smaller to enable smaller dimensions of the hollow body 12 for its easier insertion into the cavity 16 of the tubing core 2.

For enhancement of the attachment of the hollow body 12 its surface can be provided by not shown roughening.

The sleeve member 4 is then jointed by sews 18 with arms 7, 8 of the strap 3. The sews 18 are going also through the end covering cap 19 with the length of about 10 inches, which can be sewed from the inside. The end cap 19 serves to the enhancement of immediately vigorous tugs if the maximum length of the cord is achieved and to more compact arrangement around the tubing core 2 in the area of the grip.

The hollow body 12 with introduced strap 3 can be secured together with tubing core 2 provided by a collet (not shown).

Figure 5:
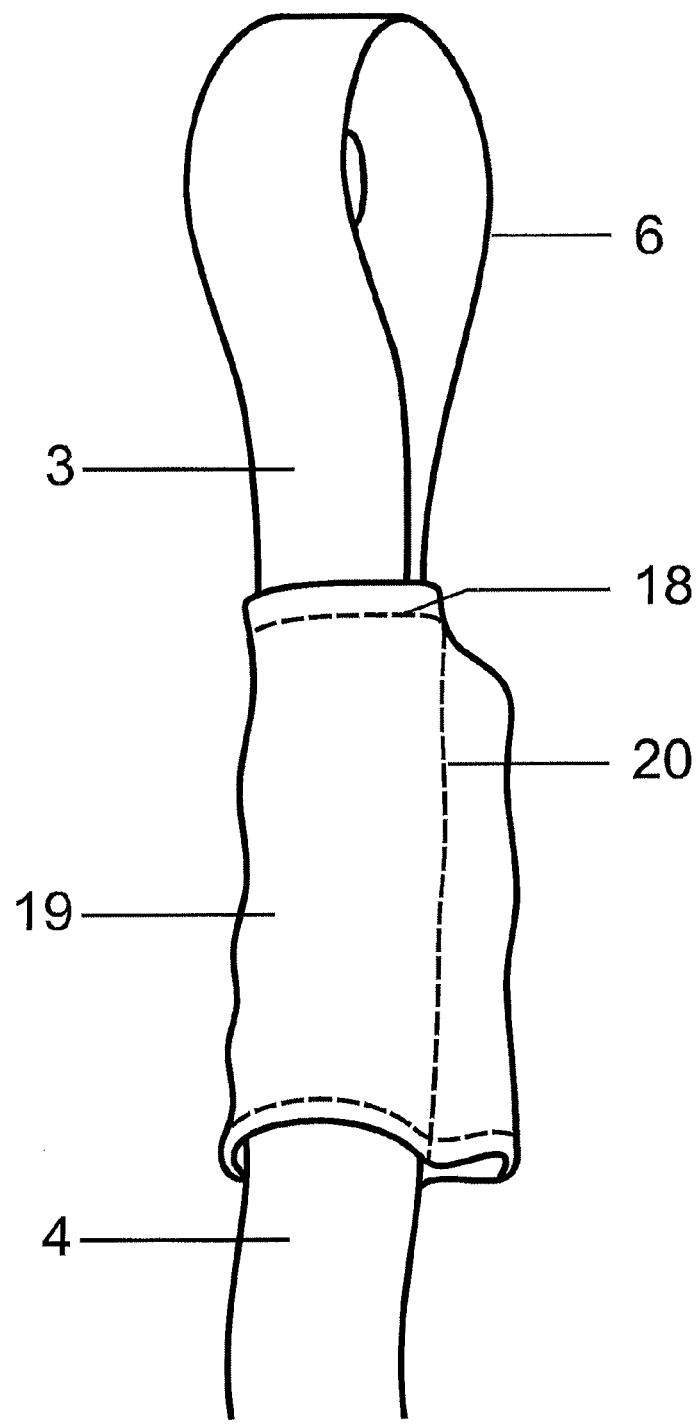
FIG. 5 is a complete view on the end of the exercise cord with the strap according to an illustrative embodiment of the invention.

In FIG. 5 a complete view on the end of the exercise cord with the strap 3 is presented. It can be seen that the end cap 19 is sewed through by longitudinal sew 20 with length of about 16 inches with the sleeve member 4, so the cap 19 together with sleeve member 4 copy as much as possible the shape connection with the tubing core 2.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An elastic exercise cord device for training, the device comprising:
    an elastic cord with a tubing, the tubing having an end;
    a strap forming a loop with two arms; and
    a connection device, the connection device coupling the strap to the tubing, the connection device having a body and a collet, the body being positioned within the tubing and having a channel that receives the arms of the strap, the arms extending along the body and through open ends of the channel, the collet being positioned around the tubing and overlapping portions of the arms of the strap outside the channel.

2. The elastic exercise cord device of claim 1, wherein an outer surface of the body is roughened.

3. The elastic exercise cord device of claim 1, further comprising a sleeve, the strap and the collet residing within the sleeve and the sleeve being sewn to the arms at a location spaced from the collet.

4. The elastic exercise cord device of claim 3, further comprising an end cap, the end cap covering the connection device, the strap loop extending out of one end of the end cap, and the tubing extending out of the other end of the end cap.

5. The elastic exercise cord device of claim 1, wherein each arm has a free end, and the collet is positioned between the body and the free ends of the arms.

6. The elastic exercise cord device of claim 2, wherein each arm has a free end, and the collet is positioned between the body and the free ends of the arms.

7. The elastic exercise cord device of claim 3, wherein each arm has a free end, and the collet is positioned between the body and the free ends of the arms.

8. The elastic exercise cord device of claim 4, wherein each arm has a free end, and the collet is positioned between the body and the free ends of the arms.

9. A connection device integrated with an elastic exercise cord device for training that includes an elastic cord with a tubing having an end and a strap forming a loop and two arms, the connection device coupling the strap to the tubing, and comprising: a body and a collet, the body being positioned within the tubing and having a channel that receives the arms of the strap, the arms extending along the body and through open ends of the channel, the collet being positioned around the tubing and overlapping portions of the arms of the strap outside the channel.

10. The connection device of claim 9, wherein an outer surface of the body is roughened.

11. The connection device of claim 9, wherein each arm has a free end, and the collet is positioned between the body and the free ends of the arms.

12. The connection device of claim 10, wherein each arm has a free end, and the collet is positioned between the body and the free ends of the arms.

\* \* \* \* \*